May 26, 1931. G. L. McCARTHY 1,806,763
PHOTOGRAPHING APPARATUS
Filed April 30, 1927 3 Sheets-Sheet 1

Inventor
George Lewis McCarthy
by Moses & Nolte
Attys

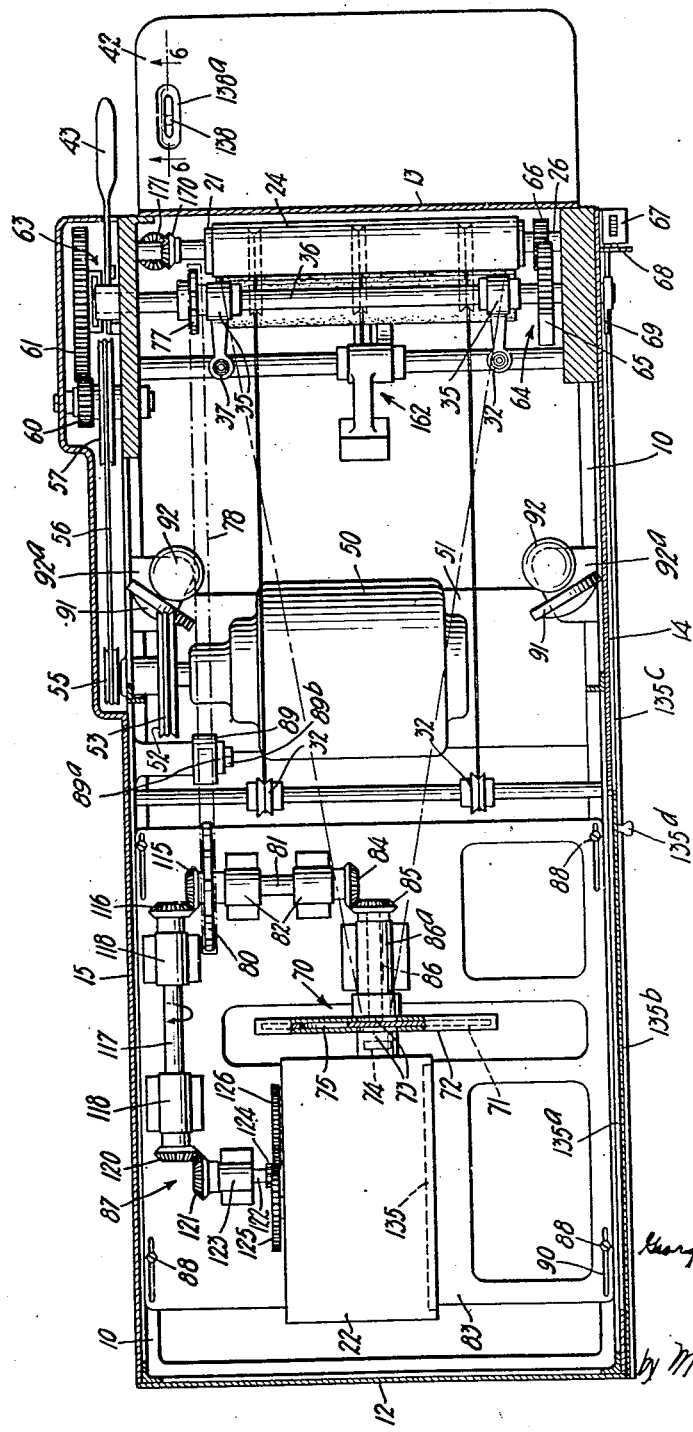

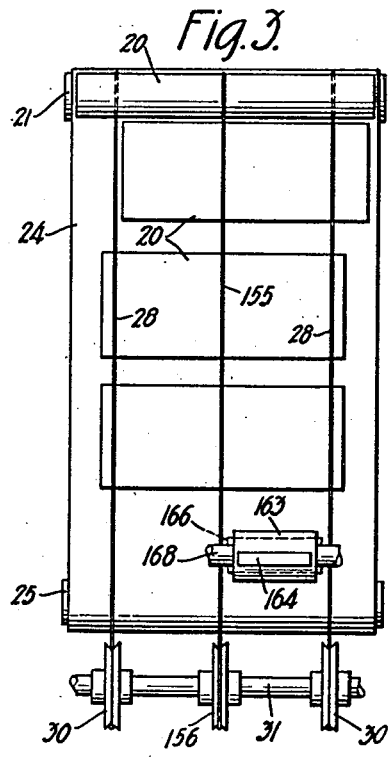

Patented May 26, 1931

1,806,763

UNITED STATES PATENT OFFICE

GEORGE LEWIS McCARTHY, OF RYE, NEW YORK

PHOTOGRAPHING APPARATUS

Application filed April 30, 1927. Serial No. 187,982.

This invention relates to apparatus for making photographic records of documents, and is in the nature of an improvement upon the apparatus disclosed in the pending joint applications of Abraham Novick and George Lewis McCarthy, Serial No. 18,075 for photographing apparatus, filed March 8, 1926, and Serial No. 118,890 for photographing apparatus, filed June 28, 1926.

The apparatus embodying the present improvements is primarily designed for making a compact, condensed photographic record of bank checks returned to depositors, although the utility of the apparatus is not confined to such use.

In common with the prior application of Novick and McCarthy, Serial No. 118,890, the illustrative machine of the present invention includes a camera, a check feeding device comprising an endless conveyor belt and endless bands confronting the belt for bodily feeding the checks step by step into the photographic field of the camera, mechanism for driving the camera shutter and for feeding the film in synchronism with the check feeding mechanism, and means for controlling the check feeding and photographing means coordinately with a computing and listing machine.

It is an object of the present invention to improve the check feeding mechanism and to reduce the degree in which such mechanism obstructs the faces of the checks at photographing. To this end narrow bands or wires which confront the check conveyor and necessarily obstruct the faces of the checks in photographing position are arranged to have only their active stretches come within the photographic field, and provision is made of means for guiding the inactive or idle stretches of the bands outside the photographic field. Provision is also made of means for maintaining these narrow bands taut, particularly when they are elongated by expansion, due to the heat of the lamps employed for illuminating the faces of the checks, so that a firm pressure will be exerted.

A further object of the invention is to provide means in an apparatus of the kind referred to above, for canceling the checks automatically.

It is a further object of the invention to provide means for notifying the operator when the film in the camera is nearly exhausted so that the apparatus will not be operated without film.

Further features of the invention consist in the simplification of the driving trains of the conveyor and of the camera shutter and the provision of a counter for indicating the number of checks fed through the machine.

Other objects and advantages will hereinafter appear.

In the drawings forming a part of this specification:

Figure 2 is a sectional top plan view of the machine taken on the line 2—2 of Figure 1;

Figure 3 is an elevation of the check presenting and conveying means;

Figure 4 is a fragmentary view showing the intermittent drive for the check conveying means and a counter connected therewith;

Figure 5 is a diagrammatic view of the interior of the camera and the signalling means, associated with the camera, to notify the attendant when the film in the camera is nearly exhausted;

Figure 6 is a detail sectional view taken on the line 6—6 of Figure 2 and shows the motor starting switch located in a groove or depression formed in the check supporting table;

Figure 7 is a circuit diagram showing how the motors, lamps, etc. are electrically connected; and Figure 8 is a diagrammatic view of another form of the invention showing a modified means to indicate when the film in the camera is about exhausted.

Figure 1:
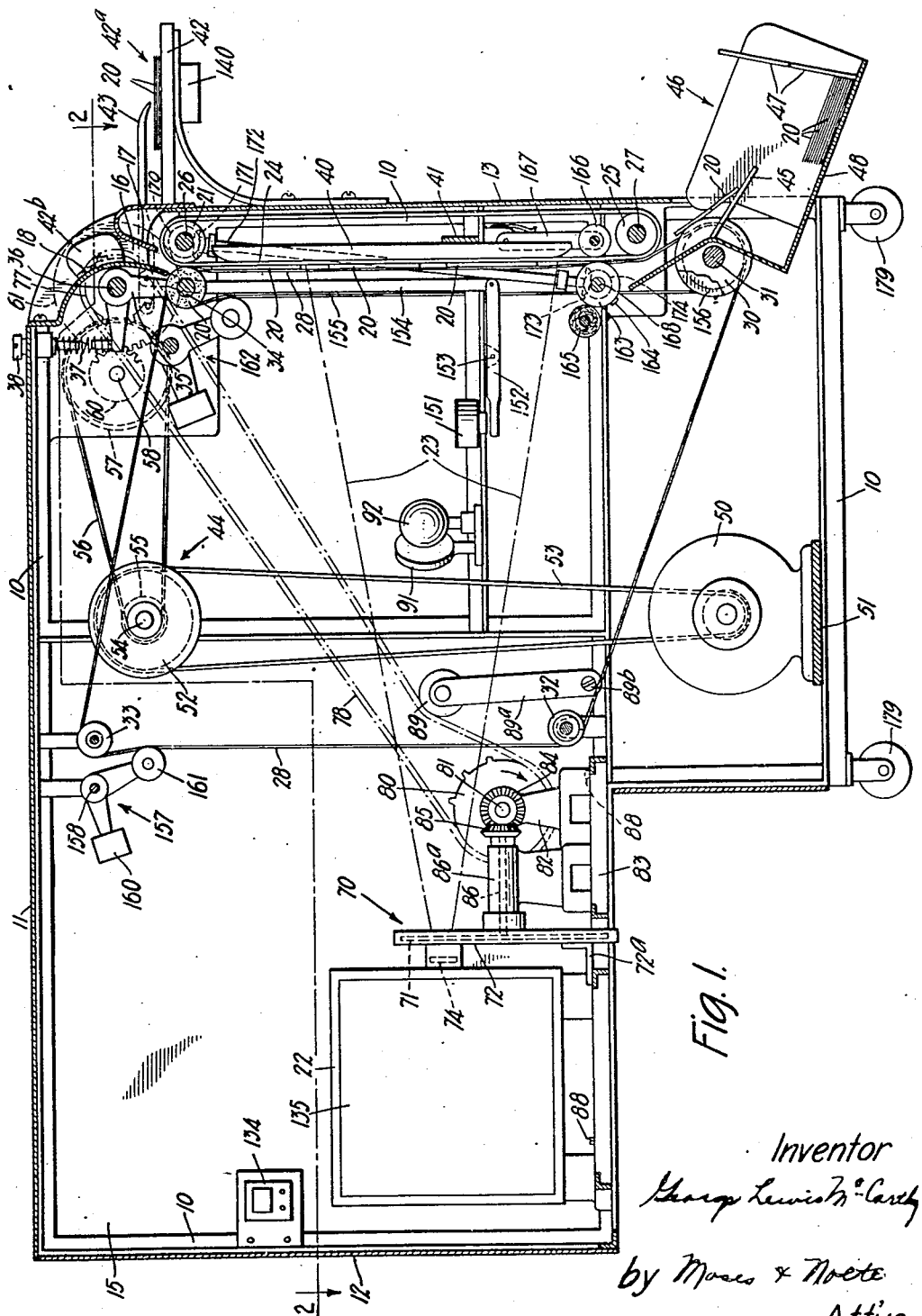
Figure 1 is a sectional side view of the machine.

The machine may include a frame 10 to which are secured a top plate 11, a rear plate 12, a front plate 13 and side plates 14 and 15.

At the upper forward part of the machine there is provided a throat 16 formed by two plates 17 and 18 suitably secured to the machine frame 10. Checks 19 may be inserted into this throat one at a time to be conducted between feed rollers 20 and 21 which are normally at rest, but which are caused to rotate at the will of the operator as hereinafter described to feed the checks into the machine to be photographed by a camera 22.

To conduct the checks to the focal range 23 of the camera there is provided a conveyor belt 24 trained over the roller 21 and a similar roller 25 in the lower part of the machine, the rollers 21 and 25 being secured to shafts 26 and 27 respectively, rotatively supported in the frame of the machine. The roller 27 may be adjustably supported in any convenient manner to put the conveyor belt under proper tension. Cooperating with the belt 24 are two endless belt like bands 28 (Figures 1 and 3) which are trained over the roller 20 and over individual guide rollers 30, supported on a bar 31 mounted in the machine frame. Instead of returning the idle stretches of the bands directly upward to the roller 20 they are first conducted rearwardly far enough to enable them to pass upward without intersecting the focal range of the camera. For this purpose they are led around guide rollers 32 and 33 suitably supported on the machine frame. With this arrangement only one stripe, due to the holding band 28, will appear on the photographed check at each side, instead of two stripes as would otherwise be the case.

The feed roller 20 is mounted on a shaft 34 carried by bell cranks 35 pivotally supported on a rod 36 which may be secured to the machine frame. The feed roller 20 is pressed against the roller 21 by springs 37, the pressure of which springs may be varied by adjusting screws 38, to procure the necessary pressure of the feed roll 20 against the roller 21.

To assist in causing the bands 28 to lie close to the conveyor 24, so as to prevent displacement of the checks while in transit, there is provided a panel 40 located behind the effective reach of the belt. Said panel may be supported by a bar 41 secured to the machine frame.

The checks may be supported in a pack 42$^a$ on a table 42 from which they may be taken to be introduced into the throat 16. An adjustable side gage 42$^b$ is secured to the plate 18 to locate the checks sidewise of the belt 24. After the introduction of each check, the movement of the conveyor belt 24 may be effected by the actuation of a lever 43 which temporarily connects the shaft 26 with constantly running driving means 44 in a manner hereinafter described.

After the checks are photographed they feed out of the machine, at the bottom, between the roller 25 and rollers 30. Fixed guide pins 45, suitably supported, conduct the checks so that they fall face down in a receptacle 46. The receptacle 46 may be supported on the machine frame in any convenient manner and includes a plurality of fingers 47, suitably secured to the floor 48 of the receptacle, to assist in piling the checks in said receptacle.

The continually running driving means 44 may include an electric motor 50 supported on a bridge 51 secured to the machine frame 10. The motor 50 drives a pulley 52 through a belt 53. The pulley 52 is secured to a shaft 54 supported in the machine frame; said shaft having secured to its outer end a pulley 55 which, through the medium of a belt 56, drives a pulley 57 rotatably supported on a stub shaft 58 which may be secured to the machine frame. A pinion 60 is secured to the pulley 57 to drive a gear 61 which is mounted to rotate freely on the shaft 36. Clutch mechanism 63, like that disclosed in the application of George Lewis McCarthy and Abraham Novick, Serial No. 118,890 for photographing apparatus, filed June 28, 1926, is operated by the lever 43 to connect the shaft 36 with the gear 61. Upon the completion of a revolution of the shaft 36, the shaft becomes automatically disconnected from the continually running gear 61 and remains at rest until the clutch lever 43 is again operated.

During the first half revolution of the shaft 36 the shaft 26 is caused to make a complete revolution to feed the check into the machine from the throat 16, as previously described, and to advance the checks previously fed into the machine, the extent of such advance being a little more than the height of one check. During the continuance of the revolution of shaft 36, shaft 26 is locked against rotation. To bring about the rotation of the belt driving shaft 26 as described, there is provided a form of Geneva gearing 64 between the shaft 36 and the shaft 26 (Figures 2 and 4), which may include a mutilated gear 65, secured to the shaft 36, to drive a pinion 66 secured to the shaft 26 to rotate the latter. To strengthen those teeth of the gears 65 and 66 which are in engagement at the commencement of rotation, they are made of double thickness so as to more readily stand the strain.

To indicate the number of checks fed into the machine there may be provided a counter 67 (Figures 2 and 4) which may be of any well known type such as, for example, the well known Veeder counter. The counter 67 is secured to the side of the machine and is provided with a star wheel 68 which is actuated by a finger 69; the finger 69 being secured to the shaft 36 so that the counter is actuated once for each rotation of the shaft 36, which shaft makes one revolution for each check fed into the machine. Thus the number of checks fed into the machine are indicated by the counter. It will be understood that it takes four revolutions of the shaft 36 to feed the check into the receptacle, after it has passed between the rollers 20 and 21 by the first rotation of the shaft 36. Consequently in order to get the actual number of checks run through the machine it is necessary to deduct four from the number indicated by the counter, assuming that the counter is set at zero when the pack of checks is started through the machine.

The checks are photographed in groups of two, and after the second check of each group has been fed into the focal range 23 of the camera the shutter 70 of the camera is opened in a manner hereinafter described, while the conveyor belt 24 and the checks thereon are at rest.

The shutter 70 includes a disc 71 (Figures 1 and 2) enclosed and rotatably supported in a stationary disc-like housing 72 secured to the machine frame 10 by a bracket 72ª. The housing 72 has therein apertures 73 in alignment with the lens 74 of the camera. The disc 71 has therein an aperture 75 which passes the apertures 73 after the last check of each group has been brought to the photographing position, the checks being projected on a film 76 (Figure 5) while the shutter 70 is open. The aperture 75 may be elongated to cause the exposure to be of the desired duration.

To operate the shutter 70, there may be provided, on the shaft 36, a sprocket 77 which drives a chain 78 cooperating with a sprocket 80 to rotate a shaft 81 supported in brackets 82 secured to a bridge 83 supported on the machine frame. The shaft 81 has secured thereto a bevel gear 84 meshing with a bevel gear 85 to drive a shaft 86 supported in a bracket 86ª also supported on the bridge 83. To the shaft 86 is secured the shutter disc 71 which makes one revolution for every two revolutions of the shaft 36, thus causing the aperture 75 to pass the apertures 73 to make an exposure after the last check of each group has entered the range of the camera. It will be remembered that the feeding of the checks takes place during the first half revolution of the shaft 36. The opening of the shutter takes place to photograph the checks during the last half of every other revolution of the shaft while the checks are at rest.

The camera 22 and its operating mechanism, including the sprocket 80, and the film controlling mechanism 87 (Figure 2), hereinafter described, are mounted on the bridge 83, which bridge is adjustable back and forth on the machine frame 10 to assist in focusing the camera 22. The bridge may be secured in adjusted position by screws 88 passing through slots 90 and threaded into the machine frame. To tighten the chain 78 as the sprocket 80 is adjusted with the bridge there is provided a roller 89 supported on an adjustable arm 89ª which may be secured in adjusted position by a screw 89ᵇ threaded into the machine frame.

Light may be projected on to the checks by two reflectors 91, one at each side of the machine, and in front of each of which is located an electric lamp 92, said reflectors and lamps being suitably supported by brackets 92ª on the machine frame.

The film 76 (Figure 5) is conducted from a supply reel 93 on a stub shaft 94 around guide rollers 95 and 96 to unwinding roller 97 provided with teeth to engage in the perforations of the film in the usual way. The roller 97 has connected thereto a pinion 98 which is rotated by a gear wheel 100. The rotation of the roller 97 produces a slack 104 in the film so that it may readily be fed over a panel 102 by a feed pawl 103, which may be operated by means (not shown) which may be connected to the gear 100. The feed pawl engages the perforations of the film to draw the latter past the lens 74; the feeding motion of the film by the pawl 103 taking place while the shutter 70 is closed. A cam disc 104 rotated by suitable means (not shown) causes the pawl to disengage the film after it has fed the film, and keeps the pawl out of engagement on its return stroke. At the completion of the return stroke of the pawl 103 the cam disc 104 swings said pawl into engagement with the film preparatory to a subsequent feed of the film. Suitable means (not shown) keeps the film from slipping back. The feed pawl 103 produces a slack 105 in the film which is taken up, as it is produced, by a tooth roller 106 like the roller 97, said roller 106 having secured thereto a pinion 107 also meshing with the gear 100 to rotate the roller 106. From the roller 106 the film is conducted around a guide roller 108 to a take-up reel 110 detachably supported on a stub shaft 112 which may be rotated in any convenient manner to wind up the exposed film as it comes from the roller 106.

To drive the film gear 100 of the film controlling means 87, Figure 2, there is secured to the shaft 81, a bevel gear 115 meshing with a bevel gear 116 to rotate a shaft 117 supported in bracket 118 secured to the bridge 83. The shaft 117 has secured thereto a bevel gear 120 meshing with a bevel gear 121 to rotate a shaft 122 in a bracket 123 secured to the bridge 83. The shaft 122 is provided with a pinion 124 (see Figure 5 also) which drives a gear 125 which may be supported on the camera 22 to rotate a gear 126 secured to a shaft 127 which extends into the camera 22 and which shaft has secured thereto the gear 100.

There is herein provided means to inform the attendant when the film is nearing the end of the supply on the reel 93. To this end a bell-crank 130 pivoted on a stud 131 is spring pressed so that one arm thereof bears against the film 76 on the reel so that when only a small portion of film remains on the reel the other arm of said bell crank makes contact with a suitably insulated conductive screw 132 mounted on the camera casing. The screw 132 is connected in a circuit with a battery 133 and a signal 134, herein shown as an audible signal such as a buzzer, but which may be a visible signal such as a lamp located in a conspicuous place. The circuit is completed by grounding the buzzer on the camera. Thus the current flows from the battery 133, through the buzzer 134, the camera casing, the bell crank 131, the screw 132 and back to the battery 133.

It will be understood that the cover plates 11, 12, 13, 15 and 16 are useful not only to house the interior mechanism of the machine, but also to confine the light of the lamps 92 which would otherwise be annoying to the operator. The plate 18 which assists in forming the throat 16 also serves as a protector to keep the light of the lamps 92 from shining into the operator's eyes.

To enable the reels 93 and 110 to be replaced the camera is provided with a side door 135 which may be opened in the usual way. The cover plate 15 has therein an opening 135$^a$ through which the operator may reach to the camera in replacing the film. This opening is kept closed, while the machine is running, by a door 135$^b$ slidingly supported on the wall 15 so that it may be drawn forwardly in track ways 135$^c$ by a knob 135$^d$ when the door is to be opened.

The motor 50 may be connected in an electric circuit (Figure 7) including two conductors 136 and 136$^a$. One of the conductors may have a switch 137 by which the current may be thrown on or off at will, to start or stop the motor. The lamps 92 may be connected in series with the switch 137, to be lighted and extinguished, respectively, upon starting and stopping of the motor. The lamps are preferably connected in parallel with the motor.

The switch 137 may include a finger-piece 138 projecting from a switch box 140 secured to the bottom of the table 43. Said table is provided with an elongated slot 138$^a$ into which the finger-piece 138 projects so that the switch may be operated, and so that the finger-piece may be below the surface of the table so as not to form an obstruction on the table. The finger-piece may be provided with shoulders 139 and 139$^a$ with the inscription "Off" and "On" respectively to indicate whether the current is off or on.

A listing machine 141 (Figure 8) of the type, for example, of the Burroughs computing and listing machine, may be provided so that the amount of each check may be listed and computation may be effected relative thereto prior to insertion of the check into the photographing machine. The listing machine may be located at the right of the photographing machine so that the keys 142 of the listing machine may be operated by the right hand of the operator while the check 20 is inserted into the machine by the left hand. Each check is inserted upside down with its face towards the camera. To print the amount of each check on a paper strip 143, after it has been set up in the machine 141 by the keys 142, there may be provided a handle 144 to operate suitable actuating mechanism (not shown) to operate the printing and computing mechanism (not shown). The strip 143 may be conducted from a supply roll 145 around a platen 146 against which the types strike to print on the strip 143.

Provision is made to actuate the clutch operating lever 43 automatically when the checks are being listed. To this end there is employed a normally open switch 147 (Figures 7 and 8) located under a lever 148 of the listing machine, which lever is swung downwardly by a link 150, upon each operation of the type actuating mechanism. Thus the switch 147 is closed at each actuation of the lever 148. The closing of the switch effects the energization of an electro-magnet 151 which may be connected in parallel with the conductors 136 and 136$^a$ as in Figure 7. When the electro-magnet 151 is energized it swings a lever 152, see Figure 1 also, about a pivot 153 to pull downwardly a link 154. The upper end of said link is connected to the clutch controlling lever 43 to actuate the latter, to effect a connection of the shaft 36 with the gear 61, of the continually running drive, by the downward pull on the link 154.

Occasionally it happens that a check is inserted carelessly into the machine by not positioning it against the side gage 42$^b$. As a result it may be held only by one band 28, or in other words at one end of the check. Under ordinary conditions this would probably not be objectionable; in other words the check would probably feed through the machine properly. If, however, the operator leaves the improperly held check in proximity to the lamps unduly long, the check will tend to curl, due to the heat of the lamps, sufficiently to partly cover its face so that it will not be photographed. To overcome this objection there is provided a third band 155 (Figures 1 and 3) in the middle of the machine, which is conducted over the roller 20 and around a pulley 156 on the shaft 31. Since the band 155 is in the middle of the machine it may be conducted back directly from the roller 156 to the roller 20 and still produce only a single line on the check.

The bands 28 and 155, which may be made of any suitable material, such as piano wire, are subject to variation in length due to temperature changes, and particularly to elongation due to heating by the lamps 92. It is important that the bands be kept taut in order to assure proper feeding of the checks. Accordingly there are provided for the bands 28 weighted tension devices pivoted on a shaft 159, and including weights 160 to cause rollers 161 to bear against the bands 28 to keep them tight. The middle band 155 may have a similar tensioning device 162 associated therewith.

Provision is made for canceling the checks as they pass through the machine. To this end there may be provided a printing roller 163 having types 164 thereon to form the word "Canceled" or any other desirable designation. The types 164 may be inked by a roller 165 saturated with ink and so positioned that only the types 164 may contact therewith during the rotation of the roller 163 which is driven in a manner hereinafter described. A spring pressed pressure roller 166 pivotally supported by arm 167 presses the check in contact with the types 164 as each check passes the printing roller 163.

To drive the printing roller 163 it may be secured to a shaft 168 supported on the machine frame and connected to the shaft 26, which moves the conveyor belt 24, by a train of gearing. The train of gearing may include a bevel gear 170 secured to the shaft 26 meshing with a bevel gear 171 to drive a downwardly extending shaft 172 suitably supported on the machine frame. The shaft 172 is provided at its lower end with a bevel gear 173 meshing with a bevel gear 174 secured to the shaft 168 to drive the printing roller 163 in a clockwise direction (Figure 1). It will be understood that the printing roller may be adjusted about the axis of the shaft 168 to cause the type to print near the top, near the middle, or near the bottom of the check, as desired.

The photographing machine may be provided with casters 179 so that it may readily be placed in a convenient position on the floor.

The listing machine may be of the well known Burroughs type which also includes a motor 176 (Figures 7 and 8) to drive the type actuating mechanism, instead of the handles 144. Said motor may be connected in parallel with the conductors 136 and 136ª, and upon the depression of a motor bar 177 by the operator, after each amount has been set up, a switch 178 is closed to supply energy to the motor 176 which then operates the type actuating mechanism.

In a modified form of the invention provision is made to disable the photographing machine and the listing machine when a minimum amount of film remains on the supply reel 93. To this end, the motor 50, lamps 92, electro-magnet 151 and listing machine motor 176 may be connected as in the circuit diagram (Figure 8). When the minimum amount of film is reached, a spring pressed follower lever 180, which engages the film 76 wound on the core of the supply reel 93, opens a switch 181 in the main circuit, thus cutting off the current, so as to stop the motor 50 of the photographing machine, put out the lamps 92, disable the electro-magnet 151 and disable the listing machine motor 176. This brings to the attention of the operator that the film is exhausted and prevents further use of the apparatus until the film supply has been replenished.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

1. In a document photographing apparatus, the combination with a camera for making a composite photographic record of distinctive business documents, of a document feeder for carrying the documents into the photographic field of the camera, comprising a driven belt traversing the photographic field, endless document gripping thread-like bands having active stretches located in the photographic field between the belt and the camera in position to be interposed between the camera and the documents and to press the documents against the belt while being photographed and while being fed to and from photographing position, and means for guiding the return or inactive stretches of the bands outside the focal range of the camera.

2. In a document photographing apparatus, the combination with a camera for making a composite photographic record of distinctive business documents, of a document feeder for carrying the documents into the photographic field of the camera, comprising a driven belt traversing the photographic field, endless thread-like bands having active stretches traversing the protographic field adjacent the belt and in parallelism with the direction of travel of the belt for engaging the exposed faces of the documents at the middle and at opposite ends thereof, means for guiding the return or inactive stretches of the end engaging bands outside the focal range of the camera, and means for guiding the middle engaging band with both the active and inactive stretches in a plane including the axis of the camera lens.

3. In a document photographing apparatus, the combination with a camera for making a composite photographic record of distinctive business documents, of a document feeder for carrying the documents into the photographic field of the camera, comprising an endless driven document carrier traversing the photographic field, and document gripping thread-like bands interposed between the document carrier and the camera in position to bear against the exposed faces of the documents to press the documents flat against the carrier during photographing, including bands for engaging the documents near the opposite ends thereof, and an intermediate band to assure the gripping of a carelessly introduced document by at least two bands.

4. In a document photographing apparatus, the combination with a camera for making a composite photographic record of distinctive business documents, and means for illuminating the documents in the photographic field, of a document feeder for carrying the documents into the photographic field of the camera for photographing, comprising an endless driven document carrier wide enough to support the documents continuously from end to end, which carrier traverses the photographic field of the camera, wires confronting the carrier for pressing the documents flat against the carrier during photographing and for preventing movement of the documents relative to the carrier, and yielding means for automatically taking up slack in the wires to maintain the wires taut.

5. In a document photographing apparatus, the combination with a camera for making a composite photographic record of distinctive business documents, and means for illuminating the documents in the photographic field, of a document feeder for carrying the documents into the photographic field of the camera for photographing, comprising a driven belt traversing the photographic field of the camera, endless wires confronting the belt for pressing the documents firmly thereagainst, yielding means for automatically taking up slack in the wires to maintain the wires taut, and a rigid support for the belt at the opposite side of the belt from the wires to enable the wires to grip the documents firmly to the belt and prevent movement of the documents relative to the belt.

6. In an apparatus for photographing documents, the combination with a camera for making a composite photographic record of distinctive business documents, of a feeder for carrying the documents into the photographic field of the camera to be photographed by it, comprising an endless driven belt, endless bands confronting the belt, rolls on which the belt and the bands run, said rolls forming an introductory bight for reception of the documents, and means for maintaining pressure between the rolls, comprising yielding means urging one of the rolls toward the other, and means for adjusting the force applied by said yielding means.

7. In an apparatus for photographing documents, the combination with a camera for making a composite photographic record of distinctive business documents, of a feeder for carrying the documents into the photographic field of the camera, for photographing, comprising an endless thread-like driven belt, endless bands confronting the belt, rolls on which the belt and the bands run, said rolls forming an introductory bight for reception of the documents, and means for maintaining pressure between the rolls, comprising yielding means urging the band guiding roll toward the belt guiding roll, means for adjusting the force applied by said yielding means, the bands being long enough to permit of such adjustment, and means for yieldingly maintaining the bands taut.

8. In a listing and recording machine, the combination with listing and computing mechanism, of recording mechanism comprising a camera and document feeding means for feeding the documents into position to be photographed by the camera, common controlling means for the listing mechanism, the feeding means and the camera, and means for counting the documents as they are listed and recorded.

9. In a document photographing apparatus, the combination with a camera for making a composite record of distinctive business documents, of means for feeding the documents to and beyond the photographic field of the camera, means for counting the documents as they are photographed, and means for automatically marking the documents as they are fed.

10. In a document photographing apparatus, the combination with a camera for making a composite record of distinctive business documents, of means for feeding the documents to and beyond the photographic field of the camera, means for counting the documents as they are photographed, and means for automatically marking the documents after they have passed the photographic field.

11. In a document photographing apparatus, the combination with a camera, for making a composite record of distinctive business documents, of means for feeding the documents to and beyond the photographic field, counting means operated by the feeding means, means for marking the documents after they have been photographed, and means for operating the feeding and marking means synchronously.

12. In a document photographing apparatus, the combination with a camera for making a composite record of distinctive business documents, of means for feeding the documents to and beyond the photographic field of the camera, comprising a step by step conveyor determining by the length of its steps the space on the conveyor allotted to each document, and a document marking roller running against the conveyor, the circumferential extent of the roller being equal to a feeding step of the conveyor.

13. In a document photographing apparatus, the combination with a camera for making a composite record of distinctive business documents, of means for feeding the documents to and beyond the photographic field of the camera, comprising a step by step conveyor determining by the length of its steps the space on the conveyor allotted to each document, and a document marking roller running against the conveyor, the circumferential extent of the roller being equal to a feeding step of the conveyor, and means for circumferentially adjusting the marking portion of the roller.

14. In a listing and recording machine, the combination with electrically operated listing mechanism and photographing mechanism, comprising a camera for making a composite record of distinctive business documents, including a film supply spool, electrically driven document feeding means for carrying the documents to the photographic field, and electric lights for illuminating the documents in photographing position, of a switch controlling the supplying of current to all of the electrically operated parts named, and means controlled by the film on the supply spool to open the switch and thereby disable all of said parts when the film needs replenishing.

15. In a listing and recording machine, the combination with listing mechanism, photographing mechanism comprising a camera for making a composite record of distinctive business documents, including a film supply spool, and feeding means for carrying documents to the photographic field, of means for disabling the camera, the feeding means and the listing mechanism when the film on the supply spool needs replenishing.

16. In a listing and recording machine, the combination with listing mechanism and recording mechanism, comprising a camera for making a composite record of a distinctive business documents, including a film supply spool, of means for operating the recording mechanism from the listing mechanism, and means for disabling the listing mechanism when the film on the supply spool needs replenishing.

In testimony whereof I have affixed my signature to this specification.

GEORGE LEWIS McCARTHY.

CERTIFICATE OF CORRECTION.

Patent No. 1,806,763.  Granted May 26, 1931, to

GEORGE LEWIS McCARTHY.

It is hereby certified that error appears in the printed specification of the above numbered patent requiring correction as follows: Page 6, line 64, claim 7, strike out the compound word "thread-like" and insert the same to follow the word "endless" in line 65; page 7, line 41, claim 16, strike out the article "a" second occurrence; and that the said Letters Patent should be read with these corrections therein that the same may conform to the record of the case in the Patent Office.

Signed and sealed this 7th day of July, A. D. 1931.

(Seal)

M. J. Moore,
Acting Commissioner of Patents.